Patented May 2, 1944

2,348,037

UNITED STATES PATENT OFFICE 2,348,037

VITAMIN AND PROCESS OF OBTAINING SAME

Sidney A. Thayer, Stephen B. Binkley, and Ralph W. McKee, St. Louis, and Donald W. MacCorquodale and Edward A. Doisy, Webster Groves, Mo., assignors to President and Board of Trustees of St. Louis University, St. Louis, Mo.

No Drawing. Application September 11, 1939, Serial No. 294,316

8 Claims. (Cl. 260—396)

The invention relates to a new chemical compound, 2-methyl-3-phytyl-1,4-naphthoquinone, useful as a therapeutic agent because of its antihemorrhagic properties.

We have isolated this new compound from certain vegetable materials, such as alfalfa, and we have also synthesized the same compound from known chemicals such as 2-methyl-1,4-naphthohydroquinone.

Prior to our invention it was known that certain natural vegetable and animal materials contained a dietary factor or factors necessary to maintain normal blood clotting time, and from these materials extracts have been obtained containing antihemorrhagic activity. The name, vitamin K, was given to designate that which was responsible for the antihemorrhagic activity. However, prior to our invention, this term, vitamin K, merely referred to an unknown factor or factors, the chemical nature or constitution of which was entirely unknown.

As a result of our invention, we have produced a new chemical compound having definite chemical and physical characteristics and having vitamin K activity. Thus for the first time a pure chemical substance capable of synthesis in the chemical laboratory has been made available for use as a therapeutic agent when vitamin K is indicated. Since our new compound has also been isolated by us from natural materials known to contain vitamin K and is probably the chief active constituent thereof, we have named it vitamin $K_1$ to indicate its physiological properties and to distinguish it from any other compound having vitamin K or antihemorrhagic activity.

Our new compound has the empirical formula $C_{31}H_{46}O_2$. It has a molecular weight of 450 and contains 82.6% carbon and 10.2% hydrogen. Its chemical name is 2-methyl-3-phytyl-1,4-naphthoquinone and it has the following structural formula

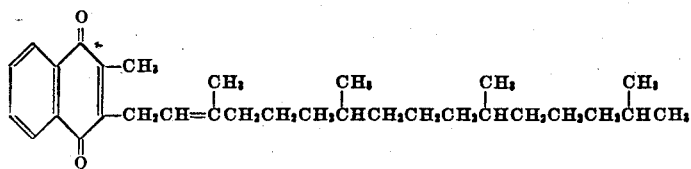

At room temperatures our compound is a light yellow viscous oil but it may be obtained in the form of slightly yellow crystals by strongly chilling alcohol or acetone solutions of the oil.

The compound has ultra-violet adsorption spectrum maxima (hexane solution) at 243, 248, 261, 270, and 323 m$\mu$. After exposure to light for a period of about forty hours or more there is a loss of maxima, leaving only a single maximum. This maximum is, after exposure to light for seventy hours, at 250 m$\mu$.

The antihemorrhagic potency of our compound, vitamin $K_1$, is 1000 or more chick units per milligram which is based on the following method of bio-assay.

White leghorn chicks one day of age are placed on a diet substantially free of antihemorrhagic factor (vitamin K) for a period of 14 days. Such vitamin K depleted chicks, if suitable for assay purposes, must show a blood clotting time of 25 to 30 or more minutes in contrast to a normal of 2 to 5 minutes.

Chicks are treated in groups of 10 using one group as a negative control and several groups for positive controls with known amounts of a standard preparation. Treatment is begun at a definite hour on the fourteenth day and repeated twice at the same time on the two succeeding days, making in all three (3) treatments of 0.2 cc. per bird per day. Treatment with solutions is done by pipette-delivering the amount directly into the crop; in the case of solid materials, it is given in capsules.

At the end of 72 hours all the birds are tested for their blood coagulation time. This is done by making a careful incision in the brachial vein and allowing two or three drops of blood to fall in the center of a perfectly clean 1½" watch glass. The clotting time is recorded from the second the blood falls on the glass until it coagulates; typical clotting formation is evidenced as the watch glasses are rotated in horizontal and vertical positions.

By definition, a positive test is one in which at least 50% of the birds in a given group show a coagulation time of 10 minutes or less and the minimum amount of material which gives such a response is said to contain one unit of activity. In the particular case here mentioned, where chicks are used, the unit of activity is designated as a chick unit.

Our new compound may be obtained by extraction from alfalfa as hereinafter described in Example 1 and it may be prepared synthetically as hereinafter described in Example 2. The products obtained by these two different processes are identical. This has been proved by a mixed melting point test with the diacetates of the vitamins obtained by the two processes.

*Example 1—Preparation of vitamin K₁ from alfalfa*

1000 pounds of thoroughly dried alfalfa meal or alfalfa leaf meal is macerated with petroleum ether (B. P. 80–100°) and then percolated with additional quantities of the same solvent during 12 hours. Approximately 500 gallons of petroleum ether are used and after percolation may contain about 20 pounds of extracted solids. The solvent is concentrated to about 120 gallons and percolated through a 5-foot column containing 500 to 750 pounds of Decalso.

After the concentrate has been run into the column, fresh petroleum ether is added and fractions are drawn off at the bottom. Sufficient fresh petroleum ether is used so that four successive fractions of about 200 gallons each can be collected.

The first fraction may possess a reddish or orange color, the second fraction a light yellow or greenish-yellow color, whereas the third and fourth fractions containing the major part of the activity should be almost colorless.

The following table shows the results of an actual adsorption experiment in which a crude alfalfa extract containing 4 million units of activity and 10,000 grams of extractives was passed through 750 pounds of Decalso.

| Fraction | Volume | Solvent | Total solids | Activity |
|---|---|---|---|---|
| | *Gallons* | | *Grams* | *Units* |
| 1 | 240 | Petroleum ether | 1,034 | <300,000 |
| 2 | 240 | ----do---- | 456 | <900,000 |
| 3 | 240 | ----do---- | 506 | 2,000,000 |
| 4 | 240 | ----do---- | 200 | 1,500,000 |
| 5 | 240 | 10% benzene in petroleum ether. | 72 | <600,000 |

The active fractions then are repercolated through either Decalso or Permutit using an amount of adsorbent corresponding to about 40 times the weight of the total solids in the fractions. In this manner fractions testing 10 to 20 micrograms per unit of activity are obtained which are suitable for further concentration either by high vacuum distillation or by further fractionation through Permutit. An alternate method at this stage involves the use of charcoal as an adsorbent, although charcoal is unsatisfactory when used on crude extracts or extracts which are not highly concentrated, such as the 10 to 20 microgram per chick unit material mentioned.

Two to five grams of a fraction assaying 2 to 5 micrograms per unit is adsorbed on a column (35 mm. x 40 cm.) of carbon (Darco) from 30–50 cc. of absolute ethyl alcohol solution. The column is washed successively with 2 l. absolute ethyl alcohol, 2 l. petroleum ether, 1 l. 50% benzene and 50% absolute alcohol and finally 3 l. of benzene. It is often necessary to wash with hot benzene to remove the last few milligrams of vitamin. The vitamin is highly concentrated in the benzene fractions. The most active fractions are then purified by distillation at $2 \times 10^{-4}$ mm. The fraction distilling between 115° to 145° is crystallized from absolute ethyl alcohol or acetone by chilling to $-70°$ C.

Pure vitamin K₁ obtained by the above described method is a light yellow oil at room temperature. It absorbs 1 mol. of hydrogen to form a colorless compound which in turn is readily oxidized by air to a yellow product. These observations, together with the analytical data presented below, and the fact that the compound contains two atoms of oxygen, suggest that the vitamin possesses a quinone structure.

Upon oxidation the vitamin yields phthalic acid, 2-methyl-1,4-naphthoquinone-3-acetic acid and a ketone which was identified as 2,6,10-trimethylpentadecanone-14. The occurrence of the first two oxidation products indicates that vitamin K₁ is a derivative of 1,4-naphthoquinone and that it contains substituents only in the 2- and 3-positions. The occurrence of the last mentioned oxidation product proves that the vitamin possesses a phytyl group in position 3.

The quinone character of the vitamin was confirmed by reducing it to the corresponding hydroquinone compound and converting the latter into a stable crystalline diacetate melting at 62°–63° C. after repeated recrystallization from methyl alcohol and mixed solvents, such as ethyl alcohol and petroleum ether. Quantitative microanalysis of the vitamin has given the following results:

C, 82.7, 82.5; H, 10.6, 10.6; mol. wt. (Rast) 443, 464. Analysis for the diacetate of the dihydro derivative has given C, 78.21, 78.01; H, 10.07, 10.03. These values, together with results of the oxidative degradation, as presented above, demonstrate that the vitamin possesses the formula $C_{31}H_{46}O_2$.

While we have given above a detailed method for obtaining vitamin K₁ from alfalfa, it is to be understood that other modifications come within our invention. Generally speaking, our process of isolation of the vitamin from natural sources differs from those previously used in obtaining of extracts in that instead of using adsorbents which inactivate the vitamin, and trying to adsorb impurities away from the vitamin substance, we have found that one can obtain a surprisingly effective purification by using adsorbents which are substantially inert to vitamin K₁ and which have a distinctly different coefficient of adsorption for the vitamin than for the impurities. After the crude extract is treated with such an adsorbent, the adsorbent carrying the vitamin substance is separated from the solvent containing the impurities and treated with solvents which remove the vitamin. The solid vitamin product can be obtained by separating it from the solvent by known methods of separating solids from their solutions, for example by distillation or crystallization methods.

The vitamin thus preliminarily purified can be again treated in a similar manner and with the same adsorbent, or with other adsorbents, even including those adsorbents which inactivate the vitamin in the presence of cruder extracts, provided such other adsorbents have a coefficient of adsorption for the vitamin different than for the remaining impurities present. Apparently the preliminary adsorption on an inert adsorbent takes out impurities which promote inactivation of the vitamin when these same impurities are present with the adsorbents previously used. For example, a charcoal or carbon adsorbent cannot be satisfactorily used in the preliminary purification because the losses of activity are too great, but after preliminary use of an inert adsorbent, charcoal can then be used for further purification with practically no destruction or loss of activity.

The preferred adsorbents are those from which the vitamin is readily removed by non-polar solvents, such as benzenoid and non-benzenoid hydrocarbons.

By subjecting the highly potent concentrates prepared by adsorption methods to additional manipulation, as for example to high vacuum distillation and/or crystallization from various solvents, we have been able to obtain the vitamin from a given source in pure form.

We have found that base-exchange silicates such as Permutit and "Decalso" are ideal for the selective adsorption of vitamin $K_1$. These commercial silicates or zeolites generally consist of sodium aluminum silicates having various molecular ratios for the constituents $Na_2O$, $Al_2O_3$; and $SiO_2$, Decalso having approximately the ratio of 1:1:6 respectively. For the first stages of purification Decalso is preferred since it is cheaper and seems to exert a more selective adsorption for chlorophyll.

The firmness with which vitamin $K_1$ is adsorbed by Decalso is to a great extent dependent upon the moisture content of the adsorbent, dry Decalso holding on to the vitamin much more tenaciously. In that case it is necessary to desorb the vitamin with mixtures of petroleum ether and benzene and in some instances with pure benzene and occasionally with a polar solvent such as acetone or alcohol.

In our preferred process a petroleum ether extract of alfalfa containing 2 to 3 percent solid extractives is passed through a column of Decalso, the chlorophyll and other pigments being retained largely in the upper part of the column. Other extractives (30% of the total) are retained less tenaciously and are readily washed through, whereas the vitamin is held somewhat more firmly so that it is found in the later fractions.

The above example is given only by way of illustrating the invention and various equivalents of the substances and steps described in the example can be used in accordance with the basic concept of the invention. However, our preferred adsorbent is a zeolite, such as the Decalso mentioned, containing more than about 10% moisture, as determined by spreading out a one-gram sample in a thin layer and heating it at 100° C. for 18 hours and then determining loss of moisture resulting from the heating. By using such moisture content, use of polar solvents is seldom needed for desorbing the vitamin.

Considerable purification of vitamin substances can be obtained by only one treatment of a crude vitamin $K_1$ extract with the inert type of adsorbent specified for use in our process. Further purification, to the extent of obtaining pure crystalline substances having vitamin $K_1$ activity, is obtained by repeating the process of adsorption and desorption one or more times with the same or with different adsorbents.

*Example 2—Preparation of vitamin $K_1$ by synthesis*

Vitamin $K_1$ may be prepared synthetically from the known compound 2-methyl-1,4-naphthohydroquinone. This latter compound may itself be synthetically prepared from 2-methylnaphthalene which is a readily available coal-tar product. The following diagram illustrates the complete method of synthesis starting with 2-methyl-naphthalene:

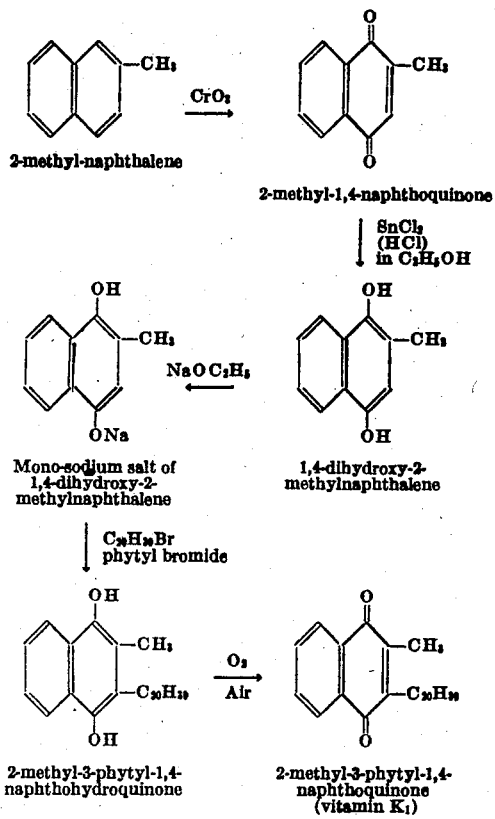

When starting with 2-methylnaphthalene, it is oxidized with chromic acid to 2-methyl-1,4-naphthoquinone and the latter reduced with stannous chloride and hydrochloric acid in an organic solvent such as ethyl alcohol to obtain the known compound, 1,4-dihydroxy-2-methylnaphthalene. This compound whether obtained by the above process or by any other method then forms the starting material for our new method for synthesizing vitamin $K_1$.

To a suspension of 11.4 g. of 1,4-dihydroxy-2-methylnaphthalene in 230 cc. of dry benzene is added the sodium ethoxide solution prepared from 1.5 g. of sodium and 23 cc. of absolute alcohol. The thoroughly stirred dark green mixture is cooled in an ice-bath and then treated with a solution of 31.4 g. of phytyl bromide in 25 cc. of dry benzene. The mixture is stirred during 2 hours and then allowed to stand overnight while the ice-bath slowly approaches room temperature.

The dark green mixture is refluxed in a water-bath for 2 hours, whereupon it is nearly neutral to litmus. After being strongly acidified with acetic acid and diluted with water, some suspended 1,4-hydroxy-2-methylnaphthalene is removed by filtration. The filtrate is orange colored.

During the time when the phytyl bromide is being added, and subsequent thereto, all operations are carried out in presence of the air which results in air oxidation of the 1,4-dihydroxy-2-methyl-3-phytyl-naphthalene, apparently as soon as it is produced. Air oxidation is only one example. Oxygen gas, per compounds and any other suitable oxidizing agent, could also be used instead of air. For example, the reaction of phytyl halide could be carried out in an inert atmosphere and the reaction products thereafter thoroughly mixed with oxygen, silver oxide or like oxidizing agents.

At this point it is possible to isolate the 2-methyl - 3 - phytyl-1,4-naphthoquinone, as described below, or the quinone compound can be reductively acetylated and the diacetate of 1,4-dihydroxy-2-methyl-3-phytyl - naphthalene first obtained in pure form and then hydrolyzed and oxidized to pure 2-methyl-3-phytyl-1,4-naphthoquinone. The hydrolysis is preferably carried out by reacting a suitable organo-magnesium compound, such as methyl magnesium iodide, with the dihydro diacetate. The oxidation can be accomplished as described above. The orange colored benzene solution is washed thoroughly with water, dried over sodium sulfate, filtered, and the benzene distilled. The residue is treated with 200 cc. of petroleum ether (B. P. 30–70°), chilled and filtered to remove more of the starting phenol.

After removal of the solvent the orange-red residue (28 grams) is washed with methyl alcohol at −5° C. in order to remove phytyl bromide, phytadiene, and other soluble impurities. The residue remaining (20 grams) is furthter purified either by distillation, collecting the fraction boiling over the range 115–160° at 2 x 10⁻⁴ mm., or by chromatographic adsorption on Decalso, Permutit and/or charcoal (Darco).

The purification step can be repeated, if desired, after which the product is a clear light-yellow oil giving the correct analysis and other properties for pure 2-methyl-3-phytyl-1,4-naphthoquinone.

This synthetic compound can be proved to be identical with 2 - methyl-3-phytyl-1,4-naphthoquinone as isolated from natural sources such as alfalfa. For example, reductive acetylation of the synthetic 2 - methyl-3-phytyl-1,4-naphthoquinone yields the diacetate of 1,4-dihydroxy-2-methyl-3-phytyl-naphthalene. For this conversion 3 grams of the vitamin are dissolved in 25 cc. of acetic anhydride containing 400 mg. of sodium acetate and treated with 1 gram of zinc dust. The mixture is refluxed for 30 minutes, during which time an additional gram of zinc dust is added.

The reaction mixture is filtered through a sintered glass filter and poured into water to decompose the acetic anhydride. The diacetate is taken up in ether, washed thoroughly with water, and, after removal of the solvent, allowed to stand at a low temperature for crystallization. It is then recrystallized repeatedly from methyl alcohol and from mixed solvents like ethyl alcohol-petroleum ether combinations or mixed alcohols. The product consists of fine silky-like needles melted at 62–63° C. and when mixed with a sample of the dihydro-diacetate of vitamin K₁ from alfalfa shows no depression in melting point.

The bio-assay of the synthetic dihydro-diacetate showed a potency of 660 units per milligram, which agrees closely with the potency of the corresponding derivative obtained from vitamin K₁ from alfalfa.

An alternate method for the synthesis consists of the direct condensation of 1,4-dihydroxy-2-methylnaphthalene with phytyl alcohol with the aid of anhydrous zinc chloride in the presence of benzene as a solvent. The reaction product may be purified by the method already described.

We prefer to carry out the above described steps in the synthesis and purification of 2-methyl-3-phytyl-1,4-naphthoquinone in the absence of light, or in the presence of a minimum of light, since too much radiation affects the compounds involved.

Our new compound having antihemorrhagic properties may be administered orally or by injection for prophylactic as well as therapeutic purposes. It may be incorporated in any suitable carrier agent with or without the addition of other medicinal compounds, vitamins or foodstuffs. The carrier agent may be either solid or liquid. For general therapeutic purposes we prefer to dissolve the compound in an oil such as maize oil.

What we claim as our invention is:

1. 2-methyl-3-phytyl-1,4-naphthoquinone.
2. 2-methyl - 3 - phytyl - 1,4 - naphthohydroquinone.
3. A product having antihemorrhagic activity comprising a carrier ingredient having incorporated therein substantially pure 2-methyl-3-phytyl-1,4-naphthoquinone.
4. In the process for synthesizing 2-methyl-3-phytyl-1,4-naphthoquinone, the step which comprises reacting a compound having the formula,

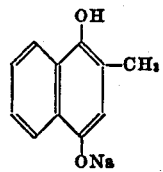

with phytyl bromide thereby obtaining 2-methyl-3-phytyl-1,4-naphthohydroquinone.

5. The process for synthesizing 2-methyl-3-phytyl-1,4-naphthoquinone which comprises reacting a compound having the formula.

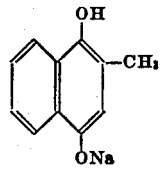

with phytyl bromide thereby obtaining 2-methyl-3-phytyl-1,4-naphthohydroquinone and oxidizing the latter to obtain 2-methyl-3-phytyl-1,4-naphthoquinone.

6. In the process for synthesizing a compound having antihemorrhagic activity, the step which comprises reacting a compound having the formula,

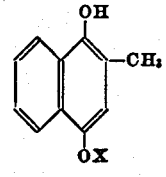

where X is a member of the group consisting of hydrogen and a metal, with a phytyl compound of the class consisting of alcohol and halide, thereby obtaining 2-methyl-3-phytyl-1,4-naphthohydroquinone.

7. The process for synthesizing 2-methyl-3-phytyl-1,4-naphthoquinone which comprises reacting a compound having the formula,

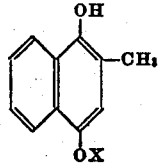

where X is a member of the group consisting of hydrogen and a metal, with a phytyl compound of the class consisting of alcohol and halide, thereby obtaining 2-methyl-3-phytyl-1,4-naphthohydroquinone, and oxidizing the latter to obtain 2-methyl-3-phytyl-1,4-naphthoquinone.

8. A product of the class consisting of 2-methyl-3-phytyl-1,4-naphthoquinone and the corresponding hydroquinone.

SIDNEY A. THAYER.
STEPHEN B. BINKLEY.
RALPH W. McKEE.
DONALD W. MacCORQUODALE.
EDWARD A. DOISY.